Oct. 22, 1940.  H. M. LINEMAN  2,218,759
SPRAYING ATTACHMENT
Filed Dec. 21, 1938

INVENTOR:
H. M. LINEMAN,
BY O. O. Martin
ATTORNEY.

Patented Oct. 22, 1940

2,218,759

UNITED STATES PATENT OFFICE 2,218,759

SPRAYING ATTACHMENT

Harry M. Lineman, Los Angeles, Calif.

Application December 21, 1938, Serial No. 247,014

2 Claims. (Cl. 299—72)

The present invention has relation to nozzles for domestic watering and sprinkling devices.

It is the object of the invention to provide a simple and inexpensive apparatus for attachment to a hose bib or hose in and around the average urban dwelling capable of delivering a fine or more concentrated spray of water in any desired direction.

Structures embodying preferred forms of the invention are illustrated in the appended drawing and hereinafter fully described.

Figure 1:
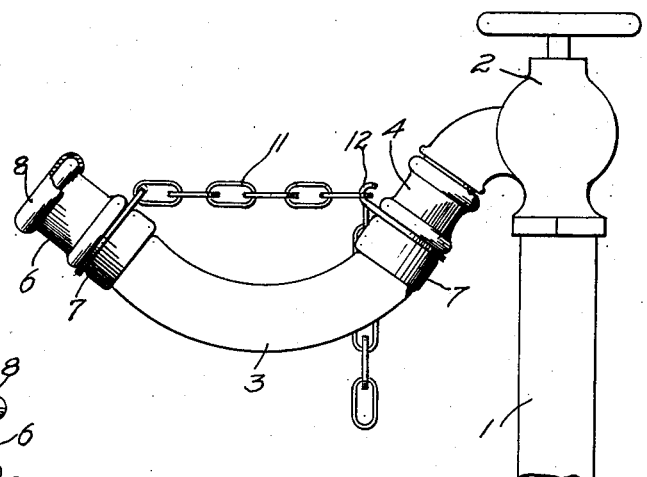
Fig. 1 shows a standpipe fitted with a bib cock and having the device of the invention attached thereto.

Hose bibs are provided in and around urban dwellings on pipes projecting from walls or rising from the ground. The latter combination is shown in Fig. 1, where the numeral 1 denotes the standpipe and 2 designates the bib cock. A short piece of flexible tubing, such as ordinary garden hose 3, is shown fitted with the usual swivel joint 4 for attachment to the screw threads of the bib cock.

To the outer end of this flexible tubing is attached a special fitting comprising a cylindrical head 6, and this head is shown combined with the usual hose clamping member 7 in any commercially accepted manner of clamping the fitting on the end of a garden hose.

On the end of the head 6 is rotatably fitted a cap 8, and the abutting faces of the head and of this cap are provided with orifices which may be brought into mutual registration by rotating the cap on the head. To illustrate this feature, it is seen that the head is made with a perforation 6$^a$ and that the cap carries two perforations 8$^a$, 8$^b$. When the cap is rotated clockwise to bring the perforations 8$^a$ into registration with the opening 6$^a$, a concentrated spray of water may be projected. When, on the other hand, the perforations 6$^a$ and 8$^b$ are mutually alined, it is seen that a very fine spray may be produced. These, however, are merely illustrative of this feature.

Figure 4:
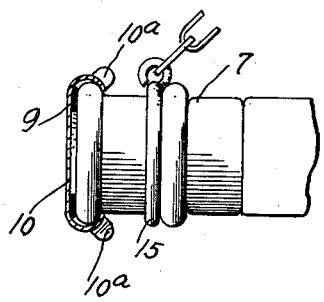
Fig. 4 is a view substantially in agreement with the foregoing but exhibiting minor modifications.

In order that the cap may be easily rotated on the head and yet be water-tightly fitted thereon, it may be well to place a soft rubber gasket between the two parts, as indicated in Fig. 4, at 9. Or, if such gasket is not found preferable, it is possible to provide means for facilitating rotative adjustment of the cap on the head, illustrative of which the cap 10, of Fig. 4, is shown made with ears 10$^a$ suitably bent out from or fastened to the rim of the cap.

By means of the swivel 4, it is possible to rotate the hose axially. In addition to this, means is provided for curving the hose, and such means is herein shown to comprise a flexible link member 11, permanently anchored on the head 6, as shown, or the swivel, and a detachable connection of this member with an anchoring member 12 on the swivel, as shown, or on the head 6. When the hose is held curved to the extent desired, it is seen that the spray may be projected in many directions merely by rotating the hose on the swivel joint. It is also noted that, by changing the curvature of the hose, substantially any direction of water projection may be obtained.

Figure 2:
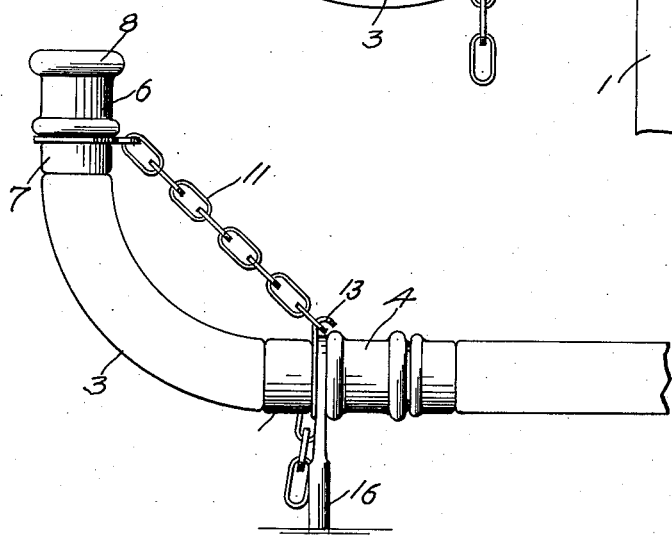
Fig. 2 shows the device of the invention attached to the end of an ordinary garden hose and fitted with means for anchoring in the ground.
Figure 3:
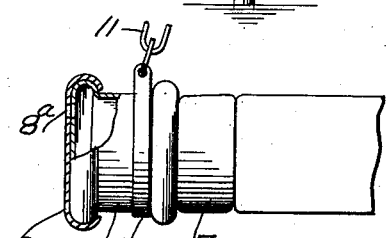
Fig. 3 is an enlarged view of the sprinkler head of the invention and with parts broken away in order to disclose the interior mechanism thereof.
Figure 5:
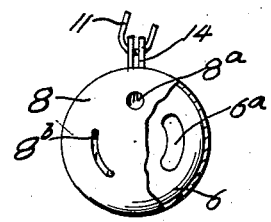
Fig. 5 illustrates the device of Fig. 3, as viewed from the front end.
Figure 6:
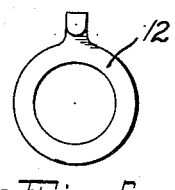
Fig. 6 shows one of the connecting parts detached.
Figure 7:
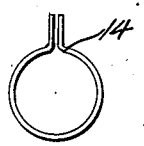
Fig. 7 illustrates another connecting part of the invention.

The anchoring member 12 may be made from sheet metal, substantially as indicated in Fig. 6, and placed in position when the swivel joint first is assembled, or it may be made from a piece of wire wound around the assembled joint, as indicated in Fig. 2. The link 11 is preferably a piece of suitable chain, and it may be fastened at one end by means of a band 14, as shown in Figs. 3, 5 and 7, or it may be merely a piece of stout wire 15, as indicated in Fig. 4.

Posts of various kinds can be purchased in the open market for anchoring the end of a garden hose in the ground. If, however, it is preferred to provide the device of the invention with such post, it is possible to mount a post 16 adjacent to the anchoring member 13, substantially as indicated in Fig. 2.

The various features of the invention above described cooperate to produce a simple, inexpensive and substantially universally directable garden spray. Further modifications of the various features may, however, be effected within the scope of the appended claims.

I claim:

1. A spraying attachment for a hose bib comprising, a swivel member attachable to the bib, an anchoring element attachable to said member so as not to interfere with rotation thereof, a second swivel member terminating in a spray head, a second anchoring element similarly attached to the latter, an intermediate flexible tube, and means for maintaining said tube in any desired degree of curvature.

2. An attachment for a hose bib comprising, a swivel member attachable to the bib, an anchoring post seated in said member, an anchoring element seated in the member adjacent to said post, a second swivel member terminating in a spray head, a second anchoring element in said second member, an intermediate flexible tube, and means attachable to said elements for maintaining said tube curved as desired.

HARRY M. LINEMAN.